(12) United States Patent
Weiler

(10) Patent No.: US 6,302,049 B1
(45) Date of Patent: Oct. 16, 2001

(54) MULTI-USE VESSEL

(75) Inventor: Robert F. Weiler, Destrehan, LA (US)

(73) Assignee: J. Ray McDermott, S.A., New Orleans, LA (US)

( * ) Notice: Subject to any disclaimer, the term of this patent is extended or adjusted under 35 U.S.C. 154(b) by 0 days.

(21) Appl. No.: 09/542,361

(22) Filed: Apr. 4, 2000

(51) Int. Cl.$^7$ .................................................. B63B 35/40
(52) U.S. Cl. ..................................... 114/259; 114/77 R
(58) Field of Search .................... 114/258, 259, 114/260, 77 R; 405/166, 167

(56) References Cited

U.S. PATENT DOCUMENTS

| | | | |
|---|---|---|---|
| 1,175,483 | * | 3/1916 | Steiner .................................. 114/260 |
| 3,823,681 | * | 7/1974 | Cushing et al. ....................... 114/260 |
| 4,465,012 | * | 8/1984 | Bos ....................................... 114/260 |
| 4,765,776 | * | 8/1988 | Howson ................................. 405/166 |
| 5,348,423 | * | 9/1994 | Maloberti et al. .................... 405/166 |
| 5,413,434 | * | 5/1995 | Stenfert et al. ....................... 405/166 |

\* cited by examiner

Primary Examiner—Sherman Basinger
(74) Attorney, Agent, or Firm—D. Neil LaHaye

(57) ABSTRACT

A multi-use vessel designed to receive a variety of float-on modules that accommodate project specialty equipment and still allow the mother vessel to operate in the traditional construction mode. The vessel may be formed as a new construction or by converting an existing vessel. The vessel is provided with a deck between the gunwales (tween deck) that is lower than the gunwales. The tween deck is provided with docking ports to receive and secure float-on modules containing the equipment required for the desired operation. The tween deck may also be provided with a moon pool for laying pipeline directly through the vessel. The vessel is ballasted to position the tween deck below the water line so that the float-on modules may be installed or removed. The gunwales of the vessel may include one or more cranes spaced along the length of the vessel for moving equipment on the float-on modules or performing installation operations and lifts as necessary. The rear gunwales may include lowering equipment for lowering equipment such as templates to the sea floor.

3 Claims, 6 Drawing Sheets

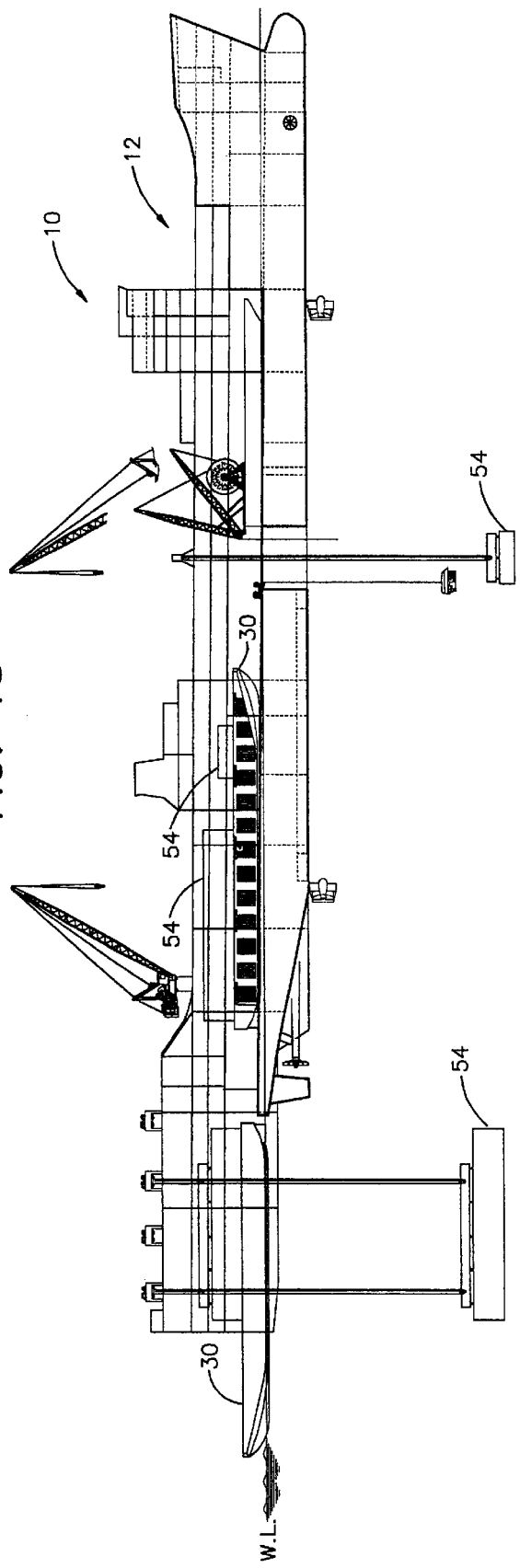
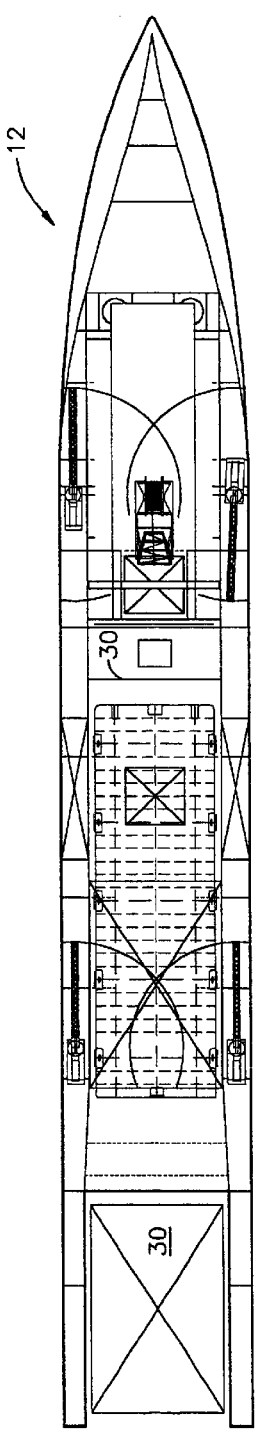
FIG. 18
FIG. 19

MULTI-USE VESSEL

BACKGROUND OF THE INVENTION

1. Field of the Invention

The invention is generally related to vessels used to provide offshore construction services and more particularly to a vessel that is adaptable to provide a variety of services.

2. General Background

In the production of hydrocarbons offshore, a variety of services are required. These services include laying pipeline on the sea floor and the installation of structures and equipment used in the drilling and production of hydrocarbons. The means used to lay pipeline depends upon a variety of factors such as water depth and pipe diameter. Directing the pipeline into the water at an angle nearly vertical to the water surface is typically used in deep water. This is generally referred to as J-Lay. Directing the pipeline into the water at a relatively shallow angle is typically used in shallow water. This is generally referred to as S-Lay. Each method uses different equipment to accomplish the task. J-Lay may use a near vertical support and stinger. In S-Lay, the pipe may be unwound from a reel as it is laid or pipe joints may be welded together on the laying vessel during the laying operation. Installing equipment and structures requires the use of lowering equipment such as cranes capable of handling the weight of the equipment.

Having one vessel capable of performing each operation is expensive as this can result in a vessel remaining idle when the specific operation that it is dedicated to is not required. Also, current vessels dedicated to specific tasks are only capable of speeds at six to seven knots.

The current state of the art leaves a need for vessels that have multiple use capability and greater speed.

SUMMARY OF THE INVENTION

The invention addresses the above need. What is provided is a multi-use vessel designed to receive a variety of float-on modules that accommodate project specialty equipment and still allow the mother vessel to operate in the traditional construction mode. The vessel may be formed as a new construction or by converting an existing vessel. The vessel is provided with a deck between the gunwales (tween deck) that is lower than the gunwales. The tween deck is provided with docking ports to receive and secure float-on modules containing the equipment required for the desired operation. The tween deck may also be provided with a moon pool for laying pipeline directly through the vessel. The vessel is ballasted to position the tween deck below the water line so that the float-on modules may be installed or removed. The gunwales of the vessel may include one or more cranes spaced along the length of the vessel for moving equipment on the float-on modules or performing installation operations and lifts as necessary. The rear gunwales may include lowering equipment for lowering equipment such as templates to the sea floor.

BRIEF DESCRIPTION OF THE DRAWINGS

For a further understanding of the nature and objects of the present invention reference should be made to the following description, taken in conjunction with the accompanying drawing in which like parts are given like reference numerals, and wherein:

FIG. 18 is a side section view of the invention set up to lower templates to the sea floor.

FIG. 19 is a plan view of the invention as set up in FIG. 18.

DETAILED DESCRIPTION OF THE PREFERRED EMBODIMENT

Figure 1:
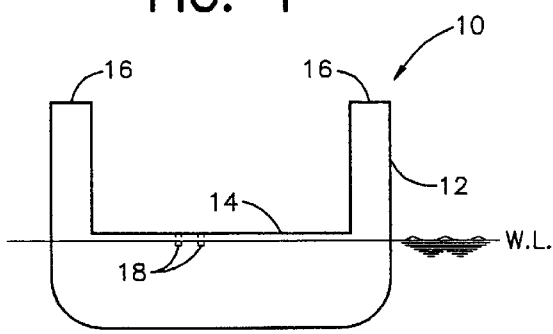
FIGS. 1–6 are rear elevation views of the vessel of the invention and illustrate the installation sequence of a float-on module.
Figure 4:
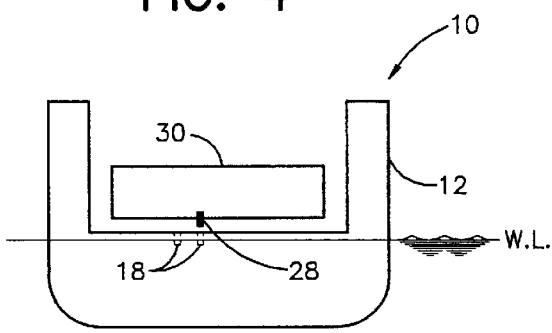

Referring to the drawings, it is seen in FIG. 1–6 that the invention is generally indicated by the numeral 10. The multi-use vessel 10 is generally comprised of a buoyant, self-propelled ship 12.

The deck (tween deck) 14 between the gunwales 16 is lower than the gunwales 16. The tween deck 14 is provided with a plurality of docking ports 18.

The ship is provided with several thrusters. At least one tunnel thruster 20 is positioned near the bow. Full three hundred sixty-degree rotating, retracting, thrusters 22 are positioned forward. Full three hundred sixty-degree rotating, retracting, thrusters 24 are positioned aft. Standard ship-type propellers 26 with rudders are provided at the stern. Although not shown, it is preferable that two each of thrusters 22 and 24 be provided.

The ship 12 may be built as a new construction or by converting an existing ship. For the type of work envisioned, the preferred ship size is approximately eight hundred to nine hundred feet long, one hundred fifteen feet wide, and capable of submerging the desired tween deck 14 ten feet below the water line. It is preferred that the tween deck 14 provide a work area of five hundred forty-eight feet in length and eighty feet in width. Existing "lash ships" that incorporate a submerged elevator platform design originally intended to handle two "Danube-Sea" barges each one hundred twenty-five feet long and thirty-six feet wide will fit within these parameters and thus conversion will save time and money over new construction.

The following generally includes the main operations required to convert a lash ship. The aft transverse sternlog is removed and replaced with a hinged aft and downward watertight door operated by hydraulic cylinders. The elevator platform is removed and the elevator winches and arm area are modified to accept a deep water lowering apparatus and equipment suitable for operations in ten thousand feet of water. The original number three tween deck dry barge storage hold is converted to a ten-foot maximum submerged deck for float in operation. The forward superstructure is enlarged. The thrusters and tunnel thrusters are added. The below-deck tanks are converted as necessary to support the new vessel ballasting requirements for submerging the tween deck. Pedestal cranes may be added along the gunwales to support construction activities. An overhead crane may be added to support template lowering operations.

Pipeline stinger handling davits/winches are added to the original elevator support area. Docking ports are added to the tween deck. Quick connect/disconnect points are added to support the various work operations.

Figure 2:
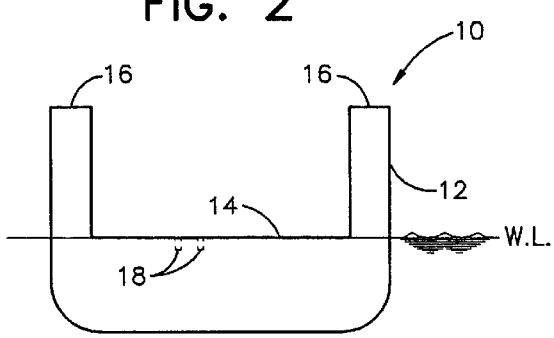
Figure 5:
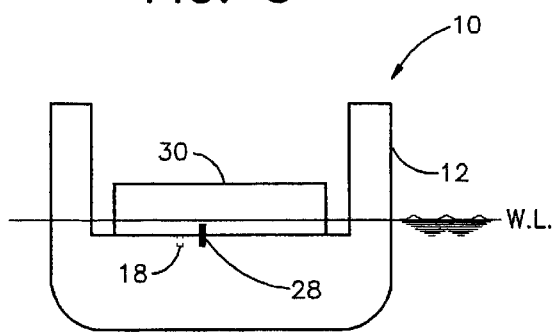
Figure 3:
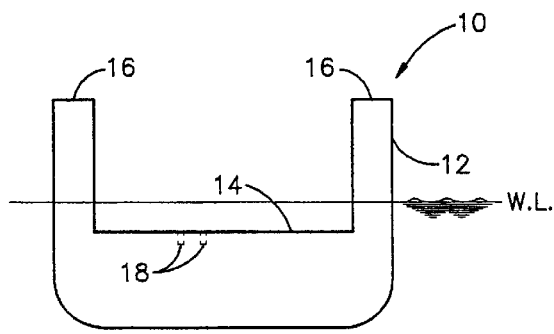
Figure 6:
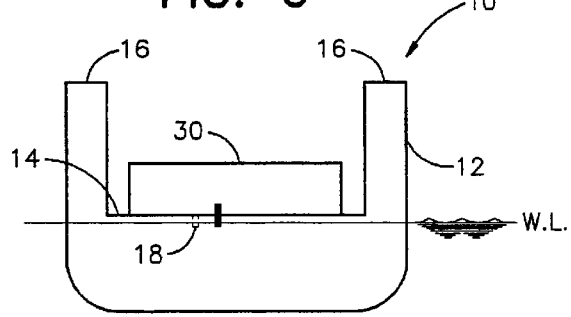

In operation, a float-on module is installed as follows. FIG. 1 illustrates the ship 12 at the normal operating draft. The ship 12 is ballasted to lower the tween deck 14 approximately ten feet below the water surface as shown in FIG. 2 and 3. One or more float-on modules 30 are floated above the tween deck 14 and positioned to align docking probes 28 with the docking ports 18. The ship 12 is then de-ballasted to raise the tween deck 14 into contact with the float-on modules 30 such that the docking probes 28 are received in the docking ports 18. For the sake of clarity, accessory equipment on the ship 12 and work equipment on the float-on module 30 are not shown.

Figure 7:
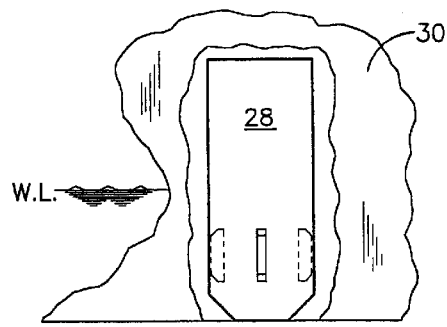
FIGS. 7–11 are enlarged detailed views that illustrate the installation sequence of the docking probe in the docking port.
Figure 8:
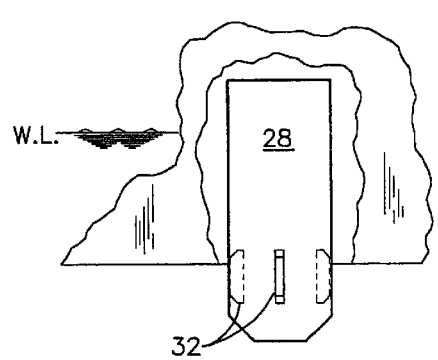
Figure 8:
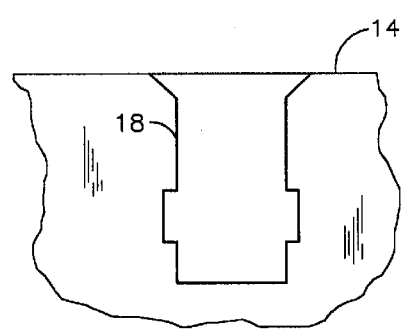
Figure 8:
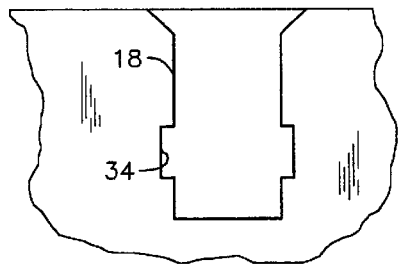
Figure 9:
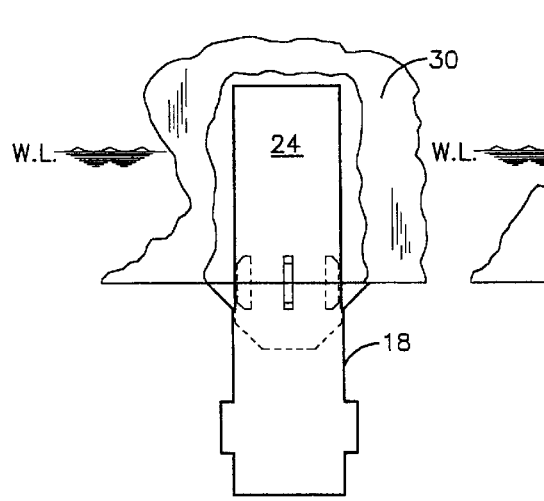
Figure 10:
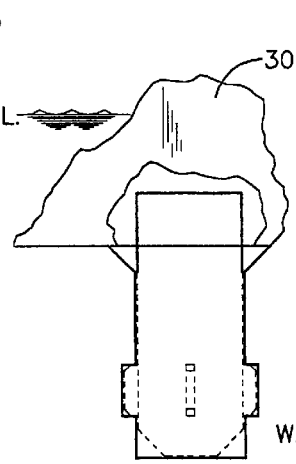
Figure 11:
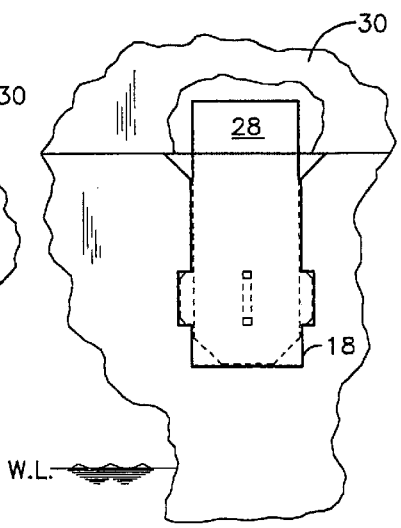

FIG. 7 illustrates the initial position of the module 30 over the deck 14. It can be seen that the docking probe 28 is in a first retracted position in the module 30. FIG. 8 illustrates the docking probe 28 moving to its second extended position toward the docking port 18. FIG. 9 illustrates the docking probe 28 being received in the docking port 18 during the initial de-ballasting of the ship. FIG. 10 illustrates the docking probe 28 fully inserted into the docking port 18. The latches 32 provided on the docking probe 28 are moved to their second extended position and received in complementary grooves 34 in the docking port 18 to lock the module 30 in position. As indicated by the water line, FIG. 11 illustrates the vessel after it has been de-ballasted and is at the normal operating draft.

Figure 12:
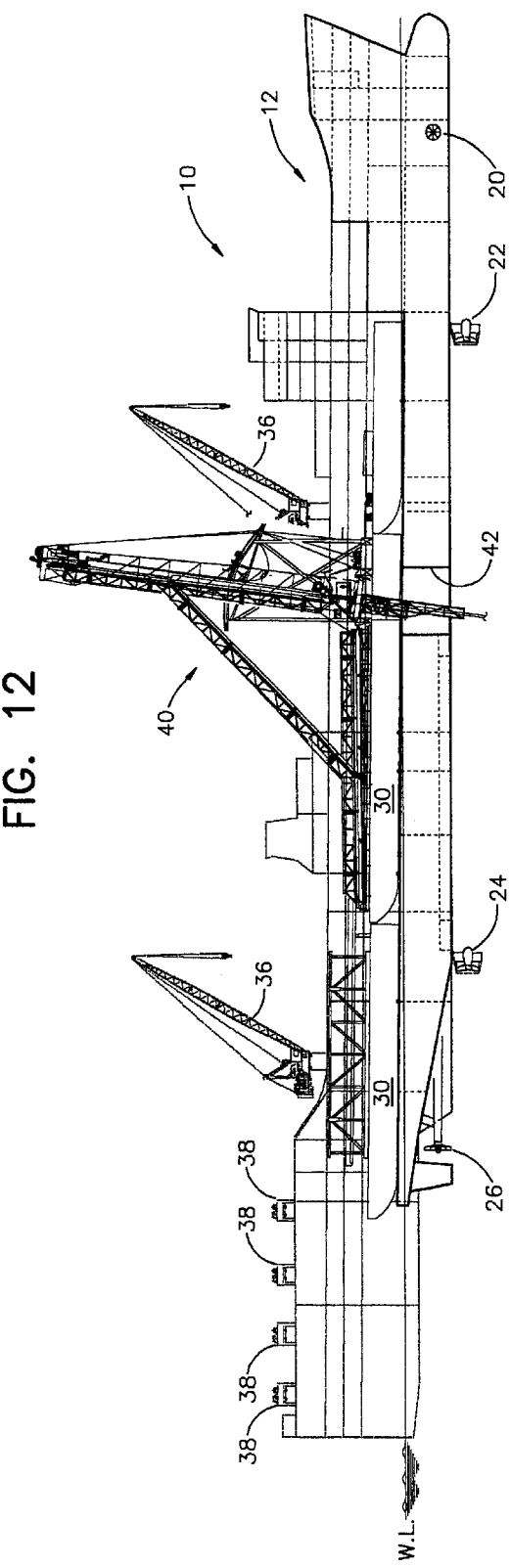
FIG. 12 is a side section view of the invention set up with J-Lay equipment for laying pipeline through a moon pool.
Figure 13:
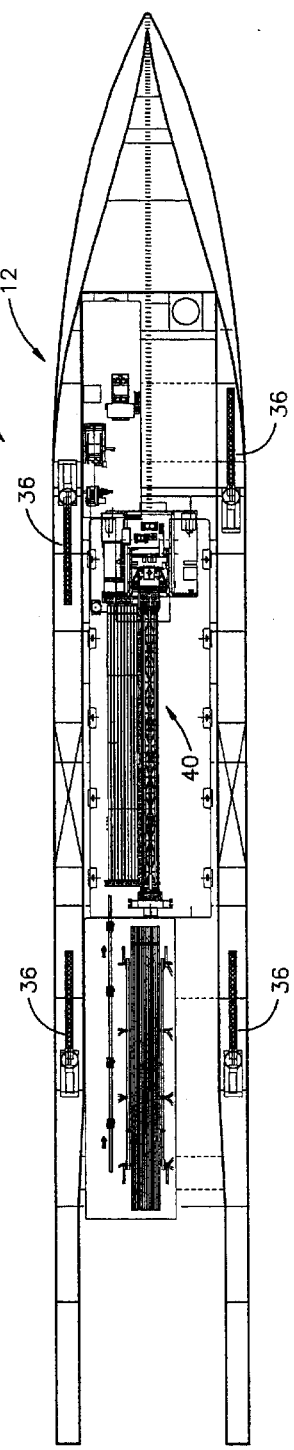
FIG. 13 is a plan view that illustrates the J-Lay equipment of FIG. 12.
Figure 14:
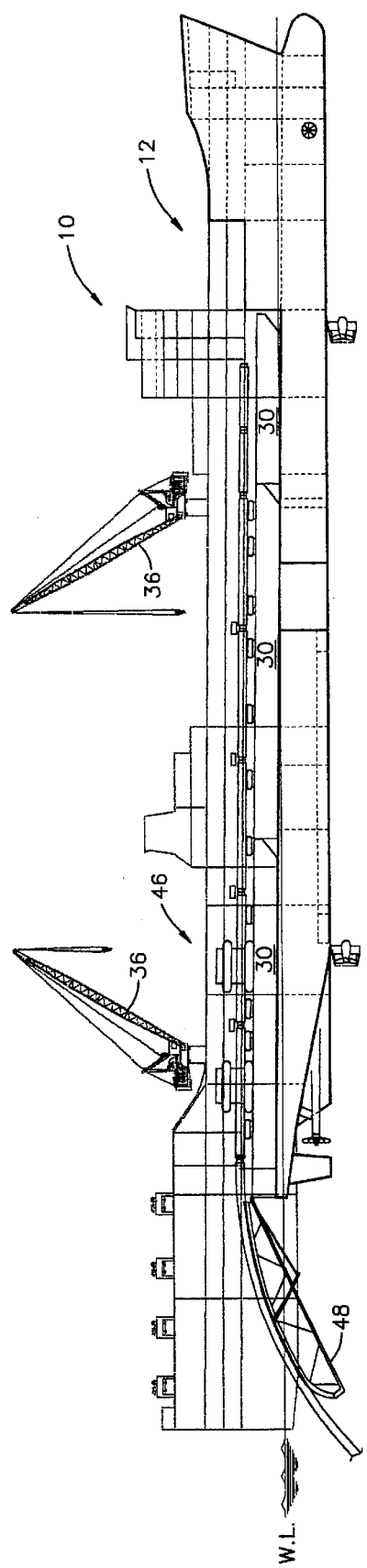
FIG. 14 is a side section view of the invention set up with S-Lay equipment for laying pipeline.
Figure 15:
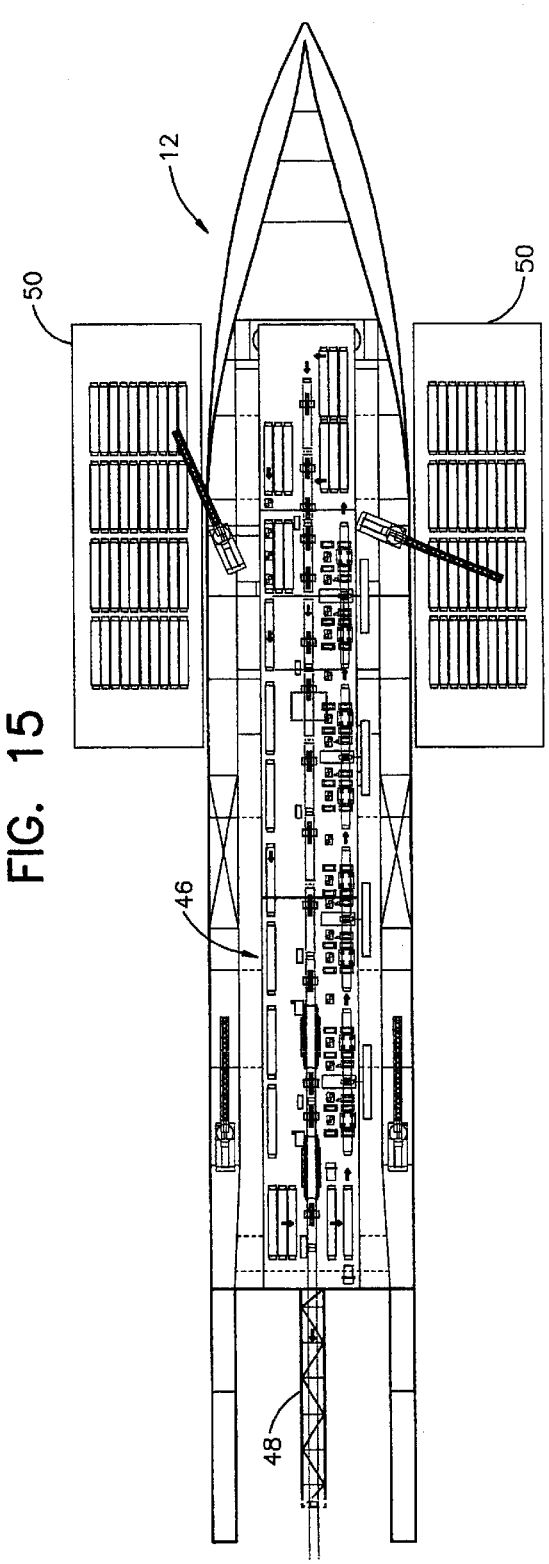
FIG. 15 is a plan view that illustrates the S-Lay equipment of FIG. 14.
Figure 16:
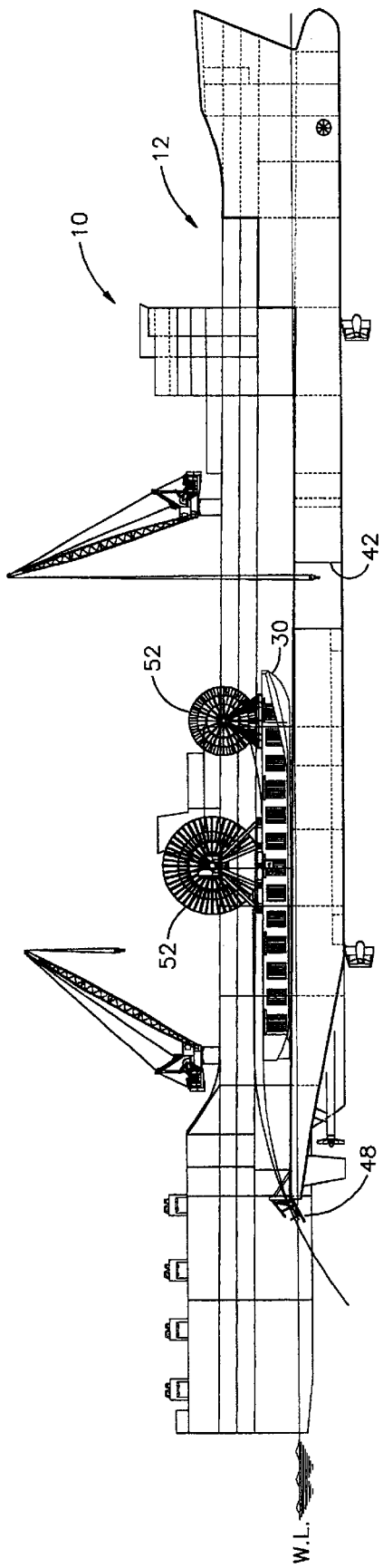
FIG. 16 is a side section view of the invention set up with reels for laying pipe or flexible line.
Figure 17:
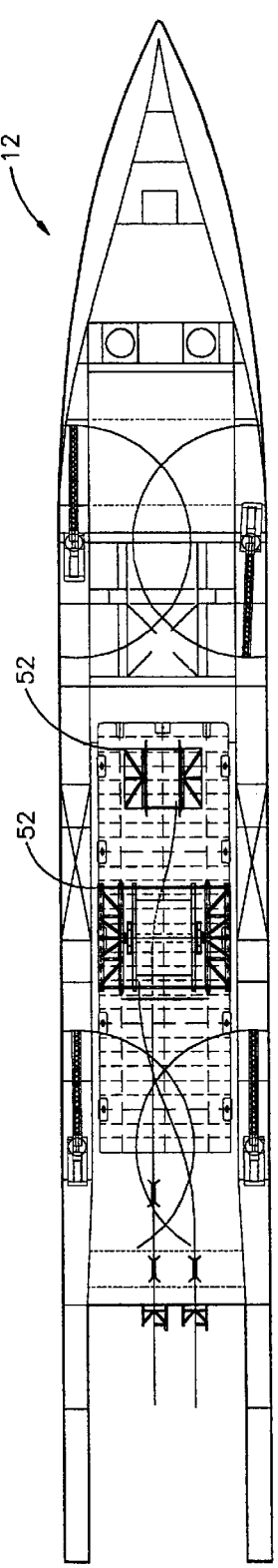
FIG. 17 is a plan view of the equipment of FIG. 16.

As seen in FIG. 12–19, the modules 30 may be used for a variety of equipment for different operations. It is also seen in these Figures that one or more cranes 36 are provided along the gunwales 16. Lowering equipment 38 is provided on the gunwales 16 at the aft section of the ship. FIG. 12 and 13 illustrate modules 30 with equipment 40 for laying pipeline in the J-Lay mode through a moon pool 42. Laying pipeline in the J-Lay mode may also be accomplished over the side of the vessel. FIG. 14 and 15 illustrate modules 30 with equipment 46 for laying pipeline in the S-Lay mode. A stinger 48 is provided at the rear of the ship 12. Barges 50 are illustrated on the sides of the ship 12 for providing pipe as it is needed during the welding and laying operations. FIG. 16 and 17 illustrate modules 30 with equipment 52 (reels) for laying pipe or flexible line on the seafloor. FIG. 18 and 19 illustrate the ship 12 set up for lowering templates 54 to the sea floor.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A method for providing a selected offshore construction service from a ship, comprising the steps of:
   a. providing a ship having a deck between the gunwales that is lower than the gunwales, with the deck between the gunwales having a plurality of docking ports;
   b. providing a watertight gate at the stem of the ship that is movable between an open and a closed position;
   c. opening the watertight gate and ballasting the ship such that the deck between the gunwales is below the water surface;
   d. selecting an offshore construction service to be performed from the ship;
   e. floating a module having docking probes and being designed to provide the selected offshore construction service above the deck between the gunwales through the open watertight gate and aligning the docking probes on the module with the docking ports on the deck between the gunwales; and
   f. deballasting the ship such that the docking probes on the module are received in the docking ports.

2. The method of claim 1, further comprising locking the docking probes in the docking ports.

3. The method of claim 1, further comprising closing the watertight gate.

* * * * *

UNITED STATES PATENT AND TRADEMARK OFFICE
CERTIFICATE OF CORRECTION

PATENT NO. : 6,302,049 B1
DATED : October 16, 2001
INVENTOR(S) : Robert F. Weiler It is certified that error appears in the above-identified patent and that said Letters Patent is hereby corrected as shown below:

<u>Column 4,</u>
Line 21, delete "stem" and insert -- stern --.

Signed and Sealed this

Twenty-eighth Day of May, 2002

*Attest:*

JAMES E. ROGAN
*Attesting Officer*   *Director of the United States Patent and Trademark Office*